US006197093B1

(12) United States Patent
Wieser-Linhart

(10) Patent No.: US 6,197,093 B1
(45) Date of Patent: Mar. 6, 2001

(54) METHOD AND APPARATUS FOR THE PURIFICATION OF WASTE GAS OF A DRYING APPARATUS

(75) Inventor: Emil A. J. Wieser-Linhart, Salzburg (AT)

(73) Assignee: Alois Sceuch GmbH, Innkreis (AT)

( * ) Notice: Subject to any disclaimer, the term of this patent is extended or adjusted under 35 U.S.C. 154(b) by 0 days.

(21) Appl. No.: 09/296,839

(22) Filed: Apr. 22, 1999

(30) Foreign Application Priority Data

May 27, 1998 (CH) .................................................. 1166/98

(51) Int. Cl.[7] .......................... B01D 53/14; B01D 53/75; B01D 53/85

(52) U.S. Cl. ................................ 95/196; 95/200; 95/205; 95/211; 95/224; 95/228; 96/273; 96/290; 96/361; 210/618; 210/626; 210/188

(58) Field of Search ............................. 95/187, 195–197, 95/199–202, 205, 210, 211, 224, 228; 96/272–274, 290, 355; 210/188, 615–617, 623, 626

(56) References Cited

U.S. PATENT DOCUMENTS

| | | | | |
|---|---|---|---|---|
| 3,803,806 | * | 4/1974 | Komline, Sr. | 95/205 |
| 4,723,968 | | 2/1988 | Schippert et al. | 55/80 |
| 4,759,777 | * | 7/1988 | Balakrishnan et al. | 95/195 X |
| 4,781,732 | * | 11/1988 | Wondrasch et al. | 95/195 X |
| 4,869,824 | * | 9/1989 | Melin et al. | 210/615 |
| 4,959,084 | * | 9/1990 | Wolverton et al. | 95/187 X |
| 5,217,616 | * | 6/1993 | Samyal et al. | 96/290 X |
| 5,232,676 | * | 8/1993 | Wolff et al. | 95/210 X |
| 5,240,600 | * | 8/1993 | Wang et al. | 210/615 X |
| 5,279,963 | * | 1/1994 | Hobby | 95/187 X |
| 6,013,512 | * | 1/2000 | Turschmid et al. | 210/615 X |
| 6,019,817 | * | 2/2000 | Seagle | 210/616 X |

FOREIGN PATENT DOCUMENTS

| | | |
|---|---|---|
| 19608834 | 9/1997 | (DE) . |
| 0528110 | 2/1993 | (EP) . |

OTHER PUBLICATIONS

Knauf,Et Al. "Biowascher–Pilotanlage Zur Reinigung Von Phenol–Und Formaldehydhaltiger Abluft" Wasser, Luft Und Boden (1994)BD–38, NR.3, pp. 62&64.

Loy, J.: "Biologische Abluftreinigung Mit Dem Tropfkoerperverfahren" Wasser, Luft Und Boden. (1993) BD. 37 NR.3, pp. 52, 54 &55.

* cited by examiner

*Primary Examiner*—Robert H. Spitzer
(74) *Attorney, Agent, or Firm*—Ladas & Parry

(57) ABSTRACT

The exhaust gas enters via an exhaust gas line into a washing apparatus. In the washing apparatus solid matter particles are predominantly separated. The pre-washed exhaust gas flows from the washing apparatus through a droplet removing conduit to a trickling filter device in order to be subjected to an activated sludge treatment for the separating of gaseous contaminants. In order to reduce the point of condensation and accordingly the absolute humidity of the exhaust gas for the activated sludge treatment either fresh air is added through a feed line to the pre-washed exhaust gas or the washing water which is led in a closed circuit through the washing water line of the washing apparatus is cooled in a heat exchanger in a cooling tower. A portion of the washing water of the washing apparatus is led through a first solid matter removing apparatus of which a portion of the filtrate is led to an activated sludge basin located under the trickling filter device. A portion of the water of the activated sludge basin coming from the trickling filter device is led to a second solid matter removing apparatus, of which a portion of the filtrate is led in a counter-move to the washing water of the washing apparatus.

10 Claims, 1 Drawing Sheet

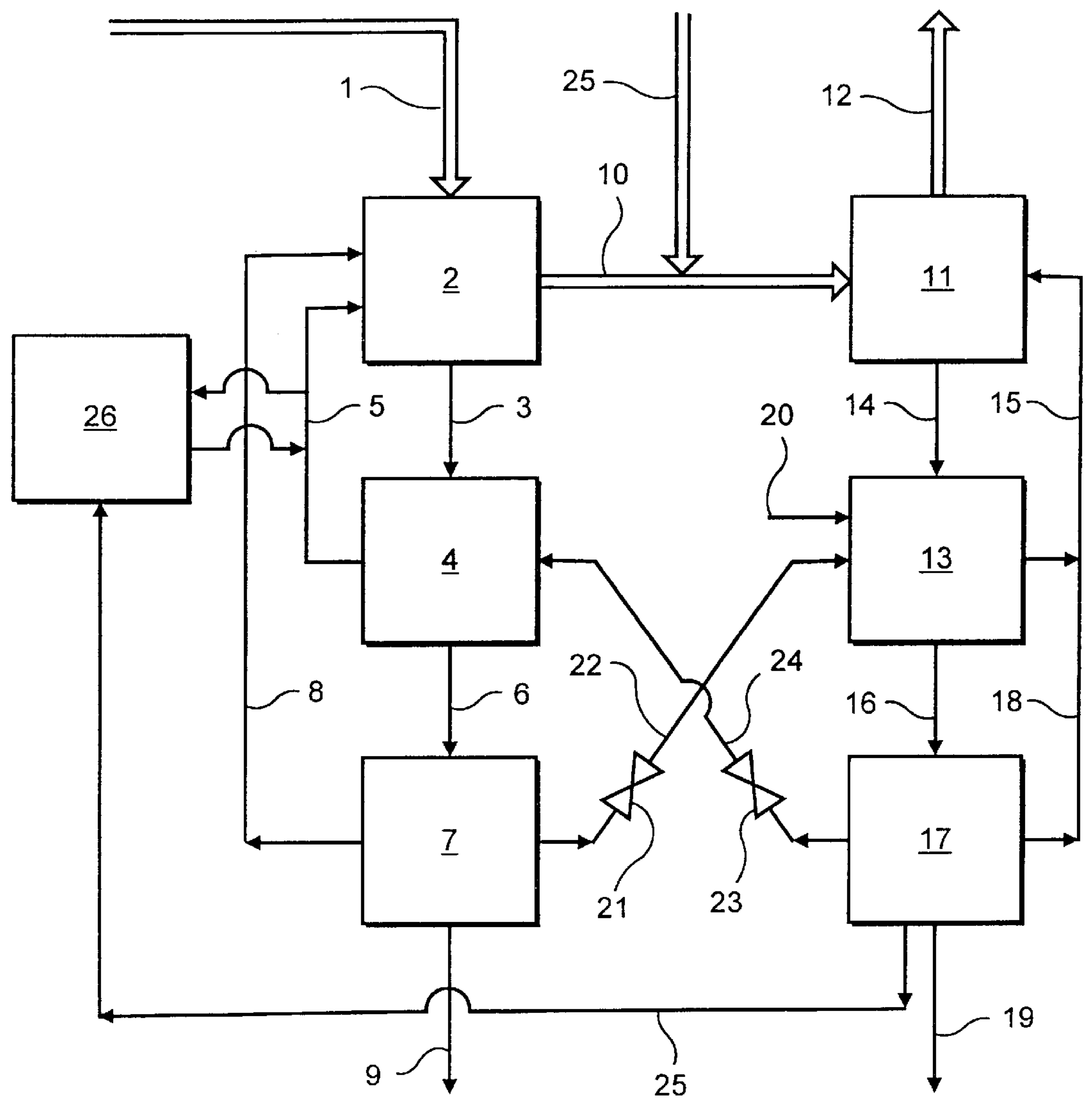
1
25
12
10
2
11
26
5
3
20
14
15
4
13
22
24
8
6
16
18
7
17
21
23
9
25
19

METHOD AND APPARATUS FOR THE PURIFICATION OF WASTE GAS OF A DRYING APPARATUS

BACKGROUND OF THE INVENTION

1. Field of the Invention

The present invention relates to a method for the purification of waste gas of an apparatus for drying biological matter. It furthermore relates to an apparatus for the purification of waste gas of an apparatus for drying biological masses.

2. Description of the Prior Art

In industrial plants, in which for instance wood or feed stock is dried, three groups of air contaminating matter is released, which groups depend from the kind of the biological mass being processed, from the design of the drying apparatuses present, and from the temperature level of the drying process. These three groups of air contaminants are a) dust, b) resin aerosols which the art also defines as blue smoke, and c) organic gases such as formaldehyde, pinenes, terpenes and organic acids.

These contaminants must be removed from the waste gas of drying apparatuses before the waste gas is released into the environment.

The purification treatment necessary for this task substantially depends from the differing portions of the above named groups of contaminants and, therefore, is to be made to suit the respective conditions encountered.

For the purification of the waste gases of drying apparatuses of wood drying plants, specifically three kinds of purifying methods and purifying apparatuses, respectively, have become known such as follows.

a) Wet-washing apparatuses with or without an addition of chemicals and with a discharge of waste water. These known apparatuses are designed as a Venturi-apparatus, a counter-current jet apparatus or also as a wet electro-filter apparatus. These apparatuses are in a position to remove dust at degrees of efficiency of 80–90%. However, regarding organic gases (e.g. formaldehyde) they are restricted to a range of 10–20% regarding the removal efficiency.

b) Regenerative thermal after-burning apparatuses including pre-washing. By means of such apparatuses it is indeed possible to remove dust and also organic gases with an efficiency of more than 90%; such after-burning apparatuses are, however, extremely expensive regarding investment as well as operation.

c) Apparatuses having a combined purification process, including a pre-washing apparatus and a bio-washing apparatus. Such apparatuses, however, specifically due to the problems regarding the removal of resin aerosols and the high points of condensation of the waste gas, have been installed rather seldom. Generally, it is indeed possible to achieve removal efficiency of dust of 80–90%, however only in case that no resin aerosols are present, and regarding organic gases a removing efficiency of not more than 50–60% can be reached.

SUMMARY OF THE INVENTION

Hence, it is a general object of the present invention to provide a method and an apparatus by means of which the drawbacks described above may be eliminated and by means of which an additional burdening of the waste water can be avoided.

A further object is to provide a method wherein during a first process step the waste gas is pre-washed in a washing apparatus having a first washing water circuit such to remove predominantly solid matter particles, whereafter during a second process step the pre-washed waste gas is subjected to an activated sludge treatment including a second washing water circuit such to remove gaseous contaminants, and wherein the temperature of the waste gas is reduced for the activated sludge treatment such to reduce its point of condensation by a reduction of the absolute humidity.

A still further object is to provide an apparatus for the purification of waste gas comprising a first washing water circuit which includes a washing apparatus, followed in the direction of the washing water flow by a pumping device and a solid matter removing apparatus, and further comprising a second washing water circuit which includes a stationary trickling filter device, followed in the direction of the washing water flow by an activated sludge basin and a second solid matter removing apparatus, which washing apparatus communicates at its waste gas exit side with the trickling filter device; and comprising an apparatus operative to reduce the temperature of the waste gas led to the trickling filter device.

The advantages gained by the invention are to be specifically seen in that the range of application for the microbiological purification of waste gas at the drying of biological masses is considerably broadened. Accordingly, higher economics are achieved. Furthermore, the availability and stability of the process are increased, whereby the investment and operation costs can be considerably reduced.

BRIEF DESCRIPTION OF THE DRAWINGS

The invention will be better understood and objects other than those set forth above will become apparent when consideration is given to the following detailed description thereof. Such description makes reference to the annexed drawing, wherein the single FIGURE illustrates in a simplified manner a circuit diagram for the explanation of the embodiments of the invention.

DETAILED DESCRIPTION OF THE PREFERRED EMBODIMENTS

Firstly, the structure of the plant or apparatus, respectively, for the purification of waste gas of a drying apparatus of a wood drying plant is explained in a general manner.

The waste gas stemming from a drying apparatus of the not specifically illustrated wood drying plant, e.g. a section of a wood chip plant, is fed through an exhaust gas line 1 to a washing apparatus 2. This washing apparatus 2 is designed in accordance with generally known designs for instance as low-pressure-Venturi or also specifically for a removal of resin aerosols as wet electro-filter.

The washing water flows out of the washing apparatus 2 and through a connecting line 3 to a pumping device 4. A first washing water line 5 runs from this pumping device 4 directly back to the washing apparatus 2.

A further connecting line 6 runs from the pumping device 4 to a first solid matter removing apparatus 7, which is also designed in accordance with generally known designs. A second washing water line 8 runs from this first solid matter removing apparatus 7 to the washing apparatus 2.

With regard to the in-fed washing water, this washing apparatus 2 includes a low pressure area and a high pressure area. The term area is to be understood as to relate to the corresponding injection nozzles for the washing water.

The distribution of the total amount of the washing water fed to the washing apparatus 2 is selected in such a manner that in the low pressure area, i.e. from the first washing water line 5 about 85–90% of the total circulating amount of washing water is injected by the corresponding nozzles, and that in the high pressure area, i.e. from the second washing water line 8 about 5–15% of the total circulating amount of washing water is injected by corresponding further nozzles.

As low pressure generally a pressure less than $10^5$ Pa, and under high pressure a pressure above $10^5$ Pa is to be understood.

The washing water droplets injected at the high pressure area at a pressure above $10^5$ Pa are so small that the available surface of the corresponding washing water is vastly increased and thus the efficiency of the removal of contaminants from the exhaust gas is considerably enhanced.

It is to be noted that the low pressure washing water coming from the pumping device 4 is recirculated directly via the first washing water line 5 to the washing apparatus 2, but, however, the high pressure washing water coming from the pumping device 4 initially runs through the first solid matter removing apparatus 7, such to be recirculated thereafter through the second washing water line 8 back to the washing apparatus 2. The reason thereto is that it is necessary to remove solid matter from this portion of the washing water because of the nozzles for the injection of the high pressure washing water due to the fineness of the nozzles.

The reference numeral 9 denotes the solid matter discharge out of the first solid matter removing apparatus 7.

The structures 2, 4, 7 of the apparatus, including the lines 3, 5, 6, 8 belonging thereto, define a first washing water circuit of the purification apparatus.

The waste gas, which has been pre-treated in the washing apparatus 2 of the first washing water circuit during a first step and from which solid matter has been removed, is led through an attenuated droplet removing line 10 of a known design to the portion of the apparatus encompassing activated sludge treatment for the removal of gaseous contaminants in a second treatment step.

The exhaust gas initially enters a trickling filter device 11.

This trickling filter device includes at least one trickling filter body of a generally known design which is wetted by a rotating spraying apparatus. The arrangement is, thereby, selected so that the exhaust gas flows in a counter-current through the downwards flowing or drizzling, respectively, washing water through the respective trickling filter body. In this embodiment the trickling filter body is assembled from plastic plates which are designed and mounted to each other in such a manner that the body includes channels extending in a zigzag fashion from the bottom to the top of the apparatus. A biological film has now grown on the surfaces of the walls of the channels, i.e. an activated sludge is present which removes gaseous contaminants from the exhaust gas.

The purified gas exits the trickling filter device 11 through the chimney 12.

The material of the trickling filter body of the trickling filter device 11 features a specific surface of 100–300 $m^2/m^3$ at a free through-flow area of more than 96%. This means that for 1 $m^3$ trickling body material 100–300 $m^2$ growth area for the biological film sludge is present and that over 96% is available as free through-flow surface (in vertical direction) for the gas being purified. The remaining 4% are the thickness, i.e. wall thickness of the plastic foils forming the trickling body material.

The stationary trickling body material, which e.g. rests on a grid, receives water sprayed thereupon by a rotating spraying apparatus. The density of the wetting amounts in this embodiment to 1–20 $m^3/m^2h$, i.e. 20 $m^3$ sprayed water is fed per each $m^2$ surface of the trickling body material per hour.

It is finally to be noted that the dwelling time of the gas being treated in the trickling body material amount to 3–30 seconds.

The water trickling down through the trickling filter apparatus 11 drips into an activated sludge basin 13 located under the trickling filter body, such as indicated in the FIGURE by the arrow 14. The activated sludge basin 13 is aerated in a generally known manner from the bottom. By means of this procedure the bio-system is stabilized and a mixed population consisting of bacteria that are stationary fixed on a support (trickling filter body), and of free bacteria which latter are circulated with the spraying water through the feed line 15 and the trickling filter body of the trickling filter device 11.

A portion of the amount of water subjected to the activated sludge flows from the activated sludge basin 13, as shown by the arrow 16, into a second solid matter removing apparatus 17. By means of this procedure the biological mass, the activated sludge, is kept within the system and, furthermore, a discharge of a small amount of discharged water through the discharge 19 is possible, e.g. in an amount of 1–10 $m^3/h$ in order to avoid the build up of salt. The remaining amount of water flows out of the second solid matter removing apparatus 17 also to the trickling filter device 11 such as indicated by feed line 18.

Furthermore, nitrogen and phosphorus are added into the activated sludge basin 13 as far as needed and such as indicated by the arrow 20. Furthermore, the pH-value of the water circuit is held in a range of 6.5–8.5 by the adding of acid or lye solution into the activated sludge basin 13.

The apparatus portions 11, 13, 17 with the respective lines 14, 15, 16, 18 form the second washing water circuit of the purification plant.

A transition line 22 having a shut-off valve 21 extends from the solid matter removing apparatus 7 of the first washing water circuit to the activated sludge basin 13 of the second washing water circuit, so that filtrate of the first washing water circuit can be fed into the activated sludge basin 13.

A further transition line 24 having a shut-off valve 23 extends from the second solid matter removing apparatus 17 of the second washing water circuit to the first washing water circuit, so that in the same sense in a counter-move it is possible to feed filtrate from the second solid matter removing apparatus 17 into the first washing water circuit.

By this two-way switching possibility it is possible to increase the total efficiency of the purification plant in that organically loaded washing water of the first washing water circuit is treated in the biology, i.e. in the activated sludge basin 13, such that already here organic gases which have been absorbed in the water of the first washing water circuit can be degraded in the activated sludge basin 13, i.e. basically in the second washing water circuit. As countermove, the filtrate of the second washing water circuit can be transferred from the second solid matter removing apparatus 17 via the transition line 24 to the first washing water circuit.

Due to the fact that organic gases in the washing water that have already been absorbed in the washing water of the first washing water circuit are directly led from the first solid matter removing apparatus 7 to the activated sludge basin 13, a distribution regarding the burden of the degrading is achieved in that a part of the process is shifted from the trickling filter body of the trickling filter device 11 to the activated sludge in the activated sludge basin 13; this improves the total degradation of the organic gases and the efficiency of the entire apparatus.

In the washing apparatus 2 a mean washing water temperature of 50–70° C. prevails. As has already been mentioned earlier, this high temperature is too high regarding a safe operation of the biological purification.

In accordance with the invention, this temperature is now decreased. Two different solutions are possible thereto, of which any one can be applied alone or both can be applied together. It shall be basically noted here that by these solutions no additional waste water and no secondary emissions are produced.

According to one of the embodiments fresh air is added through a feed line 25 to the saturated raw gas which flows from the washing apparatus 2 to the trickling filter device 11. The amount of the added fresh air can amount to 30–150% of the amount of raw gas, i.e. the amount of waste gas flowing in through the exhaust gas line 1. This leads to a new mixture point of condensation with a reduced absolute humidity resulting in a safe degrading of the organic gases by the activated sludge treatment.

According to a further embodiment, the washing water of the first washing water circuit is cooled in an indirect cooling tower 26.

As can be clearly seen in the circuit diagram, only such washing water is cooled in the cooling tower 26 which is present in the low pressure area of the washing apparatus 2. Thus, no cooling occurs regarding the quantitative relatively small amount of the washing water portion that is fed into the washing apparatus 2 at its high pressure area.

Accordingly, two alternatives for reducing the temperature of the water flowing to the trickling filter device 11 of the biological washing portion of the apparatus are possible. Which of the two possibilities is preferred depends from the absolute humidity of the raw gas, i.e. the exhaust gas fed through the exhaust gas line 1 and accordingly from the primary point of condensation, and also from the temperature which must be maintained in the second washing water circuit 11, 13–17 for the biological treatment.

In case of a high humidity of the exhaust gas, such as occurs at wood chip drying plants, it is appropriate, due to the necessary large amount of fresh air used for the cooling, i.e. for the reduction of the temperature of the exhaust gas, to apply both cooling alternatives in parallel form. At lesser humidities of raw gas, such as for instance with MDF drying apparatuses, it is a question of economy which cooling alternative is preferred. In case of MDF drying apparatus (MDF=medium-density-fibre) which is used for instance in connection with the production of woodfibre plates, and by means of this drying apparatus the mechanically fibrilated chopped shavings are dried by an air flow at a temperature of 180° C. from a moisture of 100% down to 10% the exhaust gas features, as is generally known, a small humidity.

While there are shown and described the present preferred embodiments of the invention, it is to be distinctly understood that the invention is not limited thereto but may be otherwise variously embodied and practised within the scope of the claims.

What is claimed is:

1. A method for the purification of waste gas of a drying apparatus of a wood-drying plant, comprising pre-washing, during a first process step, the waste gas in washing water of a washing apparatus having a first washing water circuit to remove predominantly solid matter particles, whereafter subjecting, during a second process step, the prewashed waste gas to an activated sludge treatment including a second washing water circuit to remove gaseous contaminants, wherein the temperature of the waste gas is reduced for the activated sludge treatment in order to reduce its point of condensation by a reduction of its absolute humidity, wherein the pre-washed waste gas is led for said activated sludge treatment through a trickling filter device which is sprayed with sprayed water, wherein the sprayed water is led from the trickling filter device to an activated sludge basin and thereafter recirculated from the activated sludge basin for spraying of the trickling filter device, and wherein the washing water of the washing apparatus is recirculated with a first part amount of the washing water, after leaving the washing apparatus, being led back via a pumping device directly to the washing apparatus and being injected into the washing apparatus by a first pressure, and with a second part amount of the washing water, after leaving the washing apparatus, being led via said pumping device to a solid matter removing apparatus and from there back to the washing apparatus into which it is injected by a second pressure in a finely divided state to increase the surface area of the washing water, the first part amount of the washing water being larger than the second part amount of the washing water, and the first pressure being lower than the second pressure.

2. The method of claim 1, wherein the first washing water circuit and the second washing water circuit include each a solid matter removing apparatus, further wherein the filtrate of the solid matter removing apparatus of the first washing water circuit is led into the second washing water circuit and/or a portion thereof is removed, and wherein the filtrate of the solid matter removing apparatus of the second washing water circuit is led into the first washing water circuit and/or a portion thereof is removed.

3. The method of claim 2, wherein in order to reduce the temperature of the waste gas fresh air in an amount of 30–150% of the waste gas is added to the pre-washed waste gas leaving the washing apparatus prior to the activated sludge treatment.

4. The method of claim 1, wherein the dwelling time of the waste gas in the trickling filter device amounts to 3–30 seconds.

5. A method for the purification of waste gas of a drying apparatus of a wood-drying plant, comprising pre-washing, during a first process step, the waste gas in washing water of a washing apparatus having a first washing water circuit to remove predominantly solid matter particles, whereafter subjecting, during a second process step, the prewashed waste gas to an activated sludge treatment including a second washing water circuit to remove gaseous contaminants, wherein the temperature of the waste gas is reduced for the activated sludge treatment in order to reduce its point of condensation by a reduction of its absolute humidity, wherein the washing water of the first washing water circuit is recirculated, wherein in order to reduce the temperature of the waste gas at least a portion of the recirculating washing water of the first washing water circuit is cooled in a heat exchanger connected to a cooling tower, and wherein an additional water requirement of the cooling tower is met by a waste water condensate that is purified in a solid matter removing apparatus of the second washing water circuit.

6. The method of claim 5, wherein the pre-washed waste gas is led for said activated sludge treatment through a trickling filter device which is subjected to sprayed water, and wherein the sprayed water after leaving the trickling filter device is led to an activated sludge basin and thereafter taken from the activated sludge basin for the spraying of the trickling filter device and accordingly is recirculated.

7. The method of claim 6, wherein the washing water of the washing apparatus is recirculated, wherein a first part amount of the washing water, after leaving the washing apparatus, is led back via a pumping device directly to the washing apparatus and is injected into the washing apparatus by a first pressure, and wherein a second part amount of the washing water, after leaving the washing apparatus, is led via said pumping device to a solid matter removing apparatus and from there back to the washing apparatus into which it is injected by a second pressure in a finely divided state to increase the surface area of the washing water, and wherein the first part amount of the washing water is larger than the second amount of the washing water, and the first pressure is lower than the second pressure.

8. A method for the purification of waste gas of a drying apparatus of a wood-drying plant, comprising pre-washing, during a first process step, the waste gas in washing water of a washing apparatus having a first washing water circuit to remove predominantly solid matter particles, whereafter subjecting, during a second process step, the prewashed waste gas to an activated sludge treatment including a second washing water circuit to remove gaseous contaminants, wherein the temperature of the waste gas is reduced for the activated sludge treatment in order to reduce its point of condensation by a reduction of its absolute humidity, wherein the washing water of the washing apparatus is recirculated with a first part amount of the washing water, after leaving the washing apparatus, being led back via a pumping device directly to the washing apparatus and being injected into the washing apparatus by a first pressure, and with a second part amount of the washing water, after leaving the washing apparatus, being led via said pumping device to a solid matter removing apparatus and from there back to the washing apparatus into which it is injected by a second pressure in a finely divided state to increase the surface area of the washing water, the first part amount of the washing water being larger than the second part amount of the washing water, and the first pressure being lower than the second pressure.

9. Apparatus for the purification of waste gas of a drying apparatus of a wood drying plant, comprising a first washing water circuit which includes a washing apparatus, followed in the direction of washing water flow by a pumping device and a first solid matter removing apparatus, a second washing water circuit which includes a stationary trickling filter device, followed in the direction of washing water flow by an activated sludge basin and a second solid matter removing apparatus, wherein the washing apparatus communicates at a waste gas exit side with the trickling filter device; and an apparatus operative to reduce the temperature of the waste gas led to the trickling filter device, wherein the pumping device includes a first washing water exit which communicates with the washing apparatus and a second washing water exit which communicates with the first solid matter removing apparatus, wherein the first solid matter removing apparatus communicates at a washing water exit thereof with the washing apparatus, wherein the trickling filter device communicates at a washing water exit thereof with the activated sludge basin, said activated sludge basin communicating at a washing water exit thereof with the trickling filter device and also with the second solid matter removing apparatus, said second solid matter removing apparatus communicating at a washing water exit thereof with the trickling filter device.

10. The apparatus of claim 9, wherein the washing apparatus communicates at its waste gas exit via a connecting conduit having an additional air inlet with the trickling filter device in order to reduce the temperature of the waste gas fed to the trickling filter device by means of additionally added fresh air.

* * * * *